US010549475B2

(12) United States Patent
Xie et al.

(10) Patent No.: US 10,549,475 B2
(45) Date of Patent: Feb. 4, 2020

(54) METHOD FOR PREPARING 3D POLYMER OBJECTS WITH SURFACE MICROSTRUCTURES

(71) Applicant: ZHEJIANG UNIVERSITY, Hangzhou, Zhejiang Province (CN)

(72) Inventors: Tao Xie, Hangzhou (CN); Jingjun Wu, Hangzhou (CN); Qian Zhao, Hangzhou (CN); Zizheng Fang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 256 days.

(21) Appl. No.: 15/415,036

(22) Filed: Jan. 25, 2017

(65) Prior Publication Data

US 2017/0217079 A1    Aug. 3, 2017

(30) Foreign Application Priority Data

Jan. 28, 2016  (CN) .......................... 2016 1 0060960

(51) Int. Cl.
*B29C 53/02*    (2006.01)
*B29C 71/02*    (2006.01)
(Continued)

(52) U.S. Cl.
CPC ............ *B29C 53/02* (2013.01); *B29C 53/005* (2013.01); *B29C 71/02* (2013.01); *B29C 2071/022* (2013.01); *B29K 2221/006* (2013.01)

(58) Field of Classification Search
CPC .......... B29K 2221/006; B29K 2901/10; B29K 2903/00; B29C 39/006; B29C 53/02;
(Continued)

(56) References Cited

U.S. PATENT DOCUMENTS 4,242,490 A * 12/1980 Emerson ............ C08G 18/4829
528/77
5,116,931 A *  5/1992 Reisch .................. C08G 18/10
428/458

(Continued)

FOREIGN PATENT DOCUMENTS

WO    WO2015144435    *  1/2015  ............. B29C 61/00

*Primary Examiner* — Alison L Hindenlang
*Assistant Examiner* — Debjani Roy
(74) *Attorney, Agent, or Firm* — Jiwen Chen

(57) ABSTRACT

The present invention discloses a method for preparing stable 3D polymer objects with surface micro-nanostructures. The method includes the following steps: Step (1): Synthesizing a thermoset 2D polymer object with surface microstructures. The polymer network contains reversible exchangeable bonds. Step (2): deforming synthesized polymer to an arbitrary desired shape above the reshaping temperature with an external force applied. The permanent reshaping temperature falls in the range of 50-130° C. and external stress is held for 5 min-24 hours Step (3): after cooling, a permanent 3D polymer object with surface microstructure is obtained. Step (2-3) can be repeated for many cycles and the 2D polymer object can be arbitrarily and cumulatively deformed to get a complex 3D structures. The polymer networks contain reversible exchangeable bonds and bond exchange catalysts in the present invention. The method disclosed in present invention is simple and efficient for preparing complex 3D polymer objects with surface micro-nanostructures.

8 Claims, 2 Drawing Sheets

(51) Int. Cl.
*B29C 53/00* (2006.01)
*B29K 221/00* (2006.01)

(58) Field of Classification Search
CPC .... B29C 53/84; B29C 33/424; C08J 2375/04; C08J 2375/08; C08J 2375/06; B29L 2031/756
See application file for complete search history.

(56) References Cited

U.S. PATENT DOCUMENTS

2013/0004857 A1* 1/2013 Kia ................ B29C 61/0608
 429/254
2017/0173854 A1* 6/2017 Bokern .............. C08G 18/4854

* cited by examiner

METHOD FOR PREPARING 3D POLYMER OBJECTS WITH SURFACE MICROSTRUCTURES

This application claims the priority benefit of Chinese Application No. 201610060960.6, filed Jan. 28, 2016, which is hereby incorporated by reference.

TECHNICAL FIELD

The present invention belongs to the field of polymer process and manufacture and, more specifically, relates to a method for preparing three-dimensional (3D) polymer objects with surface micro-nanostructures.

BACKGROUND OF THE INVENTION

Polymer surface structures, which govern a variety of material properties such as wetting, adsorption, catalyzing, friction, adhesion, and light absorption/refraction, have been highly attractive to the scientific community. The properties of polymer surface depend on their chemical compositions and surface microstructures as well as their synergy. Recent advances in polymer microstructure have led to the emergence of a variety of applications, including super-hydrophobic/self-cleaning materials, photonic crystal, microfluidics (Chen, J. Micromech. Microeng., 2015, 25: 0035001).

The representative published patents about super-hydrophobic/self-cleaning surface include Chinese patents No. CN104475309A, No. CN104449357A and U.S. Pat. No. 9,040,145. Chinese patent No. CN104475309A has disclosed a method for preparing super-hydrophobic surface, comprising: step 1: selecting a super-hydrophobic material as the substrate layer; step 2: smearing a silicone rubber precursor onto the substrate and then curing silicone rubber; step 3: preparing nanoparticle suspensions and smearing the nanoparticle suspensions onto the cured silicone rubber, after solvent volatilizing, forming the nanoparticle thin film above the silicone rubber; step 4: after ultraviolet light or heat treatment, a layered super-hydrophobic material is obtained.

The published patents about photonic crystals include No. CN104044342A, U.S. Pat. No. 8,541,150, etc. For example, Chinese patent application No. CN104044342A disclosed photonic crystal pattern through an ink-jet printing method. The photonic crystal pattern is formed as an opal structure through the method of ink-jet printing method.

The present technologies for preparation microstructures include: photolithography (U.S. Pat. Nos. 4,081,314, 4,049,347), etching method (Namba, Appl.phys.lett., 1982,40: 374), compression molding (U.S. Pat. Nos. 8,333,583, 6,482,742), micro molding (Whitesides, Science, 1996, 273: 347). Each method has its pros and cons. It is difficult for the methods mentioned above to prepare complex 3D polymer objects with surface micro-nanostructures. In the case of a polymer surface with small thickness, the shortcomings of the above methods become more obvious.

SUMMARY OF THE INVENTION

In order to overcome the drawbacks of the prior art, the present invention discloses a method for preparing stable 3D polymer objects with surface micro-nanostructures.

A method for preparing 3D polymer objects with surface micro-nanostructures comprising the following steps:

Step (1): synthesizing a 2D thermoset polymer object with surface microstructures, wherein the polymer network contains reversible exchangeable bonds.

Step (2): deforming the synthesized polymer to an arbitrary desired shape above the reshaping temperature with an external force applied, wherein the reversible exchangeable bonds undertake reversible exchange.

The reshaping temperature is above the glass transformation temperature or crystalline melting temperature of the polymer, wherein, during the heat reshaping process, the time duration of the external force or stress is kept from 5 minutes to 24 hours. Above the reshaping temperature, the reversible exchangeable bonds are activated.

Step (3): after cooling, a permanent 3D polymer object with surface micro-nanostructure is obtained.

In the present disclosure, a 2D polymer object with specific surface microstructures is fabricated by conventional methods from polymers with reversible exchangeable bonds. Afterwards, it is deformed and thermally annealed under a given temperature and stress, and the shape changes to a specific 3D shape. When an external stress is applied, the macroscopic deformation corresponds to changes in the molecular chain conformation and entropy. For the normal thermoset polymer, it will recover to its original shape after the removal of the external stress. In the present invention, by contrast, the polymer network contains reversible exchangeable bonds, which are activated under certain temperature (i.e. permanent reshaping temperature). The reversible exchangeable bonds exchange with each other and permanently alter the topographical structure of the deformed polymer under external forces while remaining at its highest entropic state. As a result, the deformed 3D shape becomes a permanent shape and will not recover to the original 2D shape after removal of the external force at the reshaping temperature.

In the present invention, the polymers with the convertible exchangeable bonds are polymerized and synthesized by conventional methods, wherein the polymers synthesized in the step (1) are polyurethane resin, polyurethane-urea resin, acid/anhydride cured epoxy resin, silicone, resin with multiple hydrogen bond, or Diels-Alder reaction products.

The reversible exchangeable bonds used in this disclosure include one or more of ester bond, urethane bond, urea bond, siloxane bond, multiple hydrogen bond, and Diels-Alder bond.

The polyurethane resin and anhydride cured epoxy resin (acid/anhydride cured epoxy resin) contain ester bonds.

The polyurethane resin is synthesized by crosslinking of polyester polyols and polyisocyanates.

Preferably, the polyester polyols are chosen from poly-caprolactone diol, poly(ethylene adipate), poly(ethylene propylene adipate) glycol, poly(diethylene glycol adipate), poly-1,4-butylene adipate glycol, polyethylene-1,4-buthylene adipateglycol, and a combination thereof.

Preferably, the polyisocyanates are chosen from but not confined to poly (hexamethylene diisocyanate), triphenyl-methane-4,4',4"-triisocyanate, and HDI tripolymer (Polyisocyanate).

The ester-bond containing epoxy resins (acid/anhydride cured epoxy resin) are obtained by reaction between expoxy resin precursors and acid or acid anhydride curing agents.

Preferably, the epoxy resin precursors can be chosen from but not limited to phenolic epoxy resin, bisphenol A diglycidyl ethers, bisphenol F diglycidyl ether, 4,4'-methylenebis (n,n-diglycidylaniline),1,3-bis(2,3-epoxypropoxy)-2,2-bis [(2,3-epoxypropoxy) methyl]propane, tetrabromobiphenol-A type diglycidly ether, hydrochinone glycol diglycidyl ether, ethylene glycol diglycidyl ether, propylenglycol diglycidyl ether, butanediol diglycidyl ether, neopentyl glycol diglycidyl ether, 1,4-butanediol diglycidyl ether, 1,6-hexylene glycol diglycidyl ether, cyclohexanedimethanol diglycidly ether, diethylene glycol diglycidyl ether, polypropylenglycol diglycidyl ether, poly-butanediol digycidyl ether, resorcinol diglycidyl ether, neopentyl glycol diglycidyl ether, bisphenol A ethoxylate diglycidyl ether, bisphenol A propoxylate diglycidyl ether, polyunsaturated fatty acid epoxide, vegetable oil epoxide, fish oil epoxide or limonene epoxide, and a combination thereof.

Preferably, the acid/anhydride curing agent can be chosen from but not limited to linear diacid that contains 2-40 carbon atoms, more preferably, selected from glutaric acid, hexanedioic acid, pimelic acid, suberic acid, azelaic acid, sebacic acid, dodecanedioic acid, ortho-benze diacid, pseudo-benze diacid, para-benze diacid, naphthalenedicarboxylic acid or higher quality agents of the same family or their mixtures; the acid/anhydride curing agent can also be chosen from fatty acids dimers or trimers, more preferably, selected from undecylenic acid, myristoleic acid, palmitoleic acid, oleic acid, linoleic acid, ricinoleic acid, eicosapentaenoic acid, docosenoic acid, and docosahexaenoic acid, or their combination thereof.

The polyurethane resin synthesized by crosslinking of polyester polyols and polyisocyanates also contains urethane bonds. The polyurethane resin synthesized by crosslinking of polyether polyol and polyisocyanates also contains urethane bonds.

The conventional polyether polyol may be used to prepare the polyurethane resin of the present invention. Preferably, polyether polyol is selected from polyoxyethylene glycol, polytetrahydrofuran glycol, and tetrahydrofuranoxide propylene copolymer glycol, or a combination thereof.

During the preparation of the polyurethane resin, diamine or polyamine can be introduced into the system as chain extenders or chain crosslinkers. In this case, urea bond is formed in the polymer network, which is also a reversible exchangeable bond like urethane bond. Preferably, the diamine or polyamine can be selected from one or more of ethylenediamine, 1,3-diaminopropane, 1,6-diaminohexane, phenylenediamine, dodecane-dodecylamine, and polymethylene diamine.

The polymers with siloxane bond are mainly silicone rubber, all the commercial silicone formulations can be applied in this invention.

The polymers with multiple hydrogen bonds are prepared by crosslinking precursors containing multiple hydrogen bonds. The polymer obtained by crosslinking contain multiple hydrogen bonds as the reversible exchangeable bonds. Advantageously, the multiple hydrogen bonds can be chosen from ureidopyrimidinone-based quadrupolar hydrogen bonding system.

The Diels-Alder polymers are prepared by crosslinking the polymers precursors that respectively contain conjugated dienes and alkene (or alkyne), wherein the irreversible exchangeable bonds contained in the polymers are Diels-Alder bond.

In the process of preparing polymers with ester bond, urethane bond, urea bond, or siloxane bond, bond exchange catalyst is added.

The bond exchange catalyst is used to decrease the activation temperature, increase the bond exchange efficiency and reduce the process time.

Preferably, the catalyst used to activate the ester bond, urethane bond, urea bond exchange can be chosen from 1,5,7-triazabicyclo[4.4.0]dec-5-ene, salts of tin, zinc, magnesium, cobalt, calcium, or benzyldimethylamide.

Preferably, the catalyst used to activate the siloxane bond exchange can be chosen from potassium hydroxide, sodium hydroxide, quaternary ammonium, quaternary phosphonium, triethylamine, dibenzylamine, tribenzylamine.

Preferably, the concentration of the catalyst in the prepared polymer is at least 0.05 wt %.

For further optimization, the concentration of the catalyst in the prepared polymer is 0.1-5 wt %.

The reversible exchange results are better for the reversible exchangeable bonds within the polymers with the multiple hydrogen bonds and the Diels-Alder polymers. Thus, no catalysts are needed for preparing the multiple hydrogen bonds and the Diels-Alder polymers.

In step (1), the two dimensional surfaces of the polymers with micro-nanostructure are firstly prepared by conventional methods. During the process of preparation, the fabrication technology can be chosen from direct molding method, photolithography/softlithography, compression molding or etching method. Taking direct molding method for example, the process includes: preparing the polymer precursor mentioned above, pouring the precursor into the mold that has microstructure, after curing and de-molding, a 2D polymer object with microstructure is obtained.

It should be pointed out that, the inert polymers, which don't contain any reversible exchangeable bonds mentioned above, can be added to the current polymer system in the present invention. However, the percentage of the polymers containing reversible exchangeable bonds should be at least 20% mole ratio to guarantee the reshaping performance.

According to the present invention, it requires specific heat reshaping temperature and external stress to transform the two-dimensional surfaces of the polymers with micro-nanostructure firstly prepared by conventional methods into three-dimensional curved surface. During the heat reshaping process, reversible exchange occurs between one or more of the chemical bonds selected from ester bond, urethane bond, urea bond, siloxane bond, multiple hydrogen bonds, Diels-Alder of the polymers. The stress in the polymers is released. The whole process is a zero entropy process. The obtained 3D curved surface is a stable permanent structure.

In step (2), different polymers are selected and the required heat reshaping temperatures are different. Preferably, the reshaping temperature is 10° C. above the glass transformation temperature or crystalline melting temperature of the polymer.

More preferably, in step (2), the heat shaping temperature is 50° C.-130° C.; the external stress is kept from 5 minutes-24 hours.

Step (2) and step (3) can be repeated for multiple cycles to obtain multiple accumulated polymer 3D curve surfaces with micro-nanostructure.

The 3D curve surfaces of the polymers obtained after each heat treatment is a stable permanent structure. In other words, one or more heat reshaping treatments of steps (2) can be taken on the basis of the 3D curve surfaces to obtain accumulated new 3D surfaces. This feature of the method proposed by the present invention is especially useful in preparing some very complex micro-nanostructures of the 3D curve surfaces, which is very difficult to do according to the prior art.

The present invention discloses a method for preparing 3D polymer objects with surface microstructures. Compared with the existing technology, the beneficial effects of the present invention are embodied below:

(1) The method of the present invention is completely consistent with conventional methods for preparing a specific microstructure on a 2D surface, and there are no additional requirements for the equipment and operation.

(2) Remedy the defects of the conventional methods that can only prepare microstructures on 2D polymer objects and simple 3D surface.

DETAILED DESCRIPTION OF THE INVENTION

Figure 1:
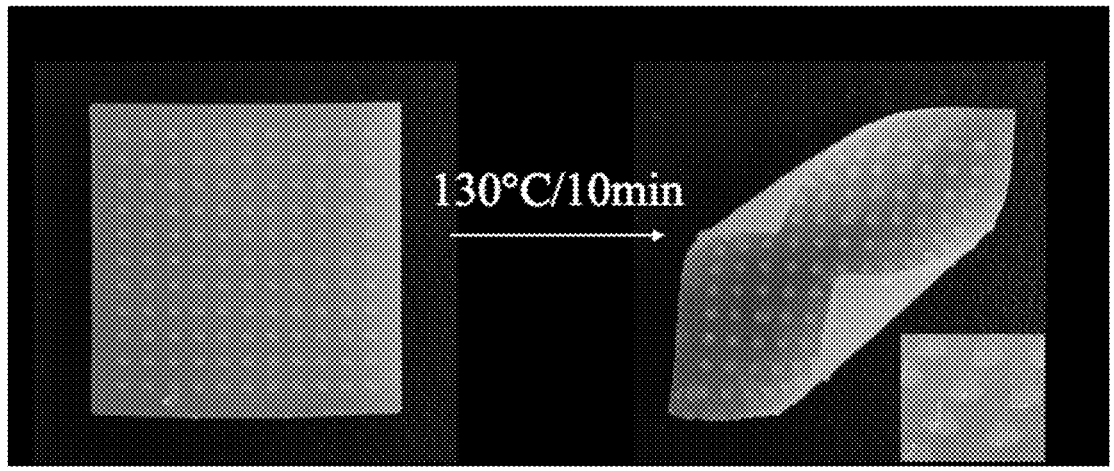
FIG. 1 illustrates the 3D polymer with surface microstructures prepared by exemplary embodiment 1.
Figure 2:
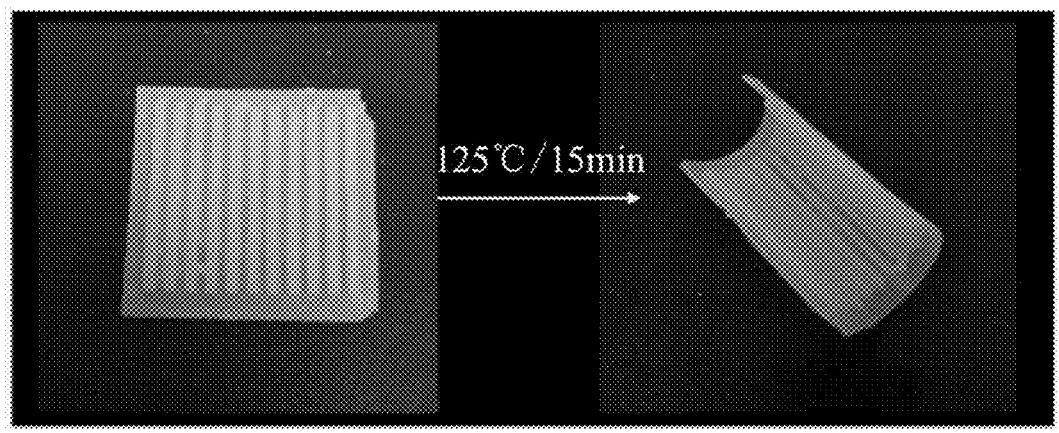
FIG. 2 illustrates the 3D polymer with surface microstructures prepared by exemplary embodiment 2.
Figure 3:
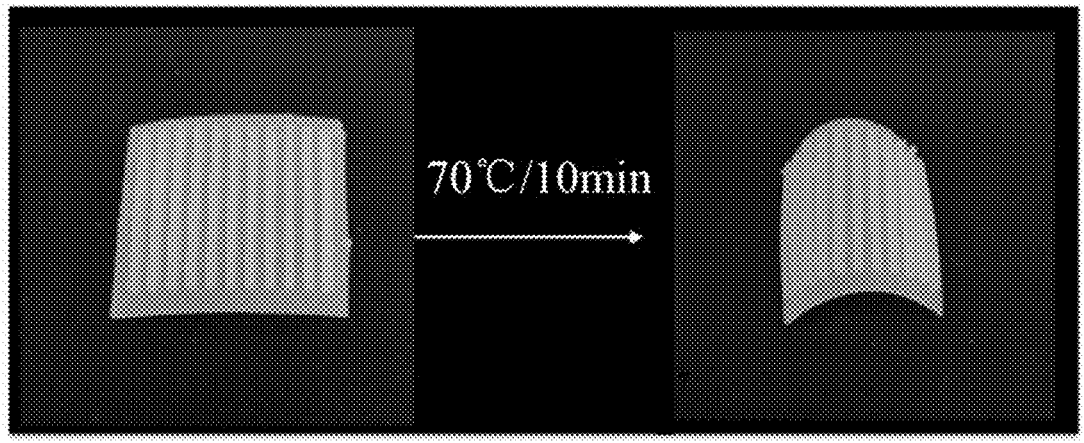
FIG. 3 illustrates the 3D polymer with surface microstructures prepared by exemplary embodiment 3.
Figure 4:
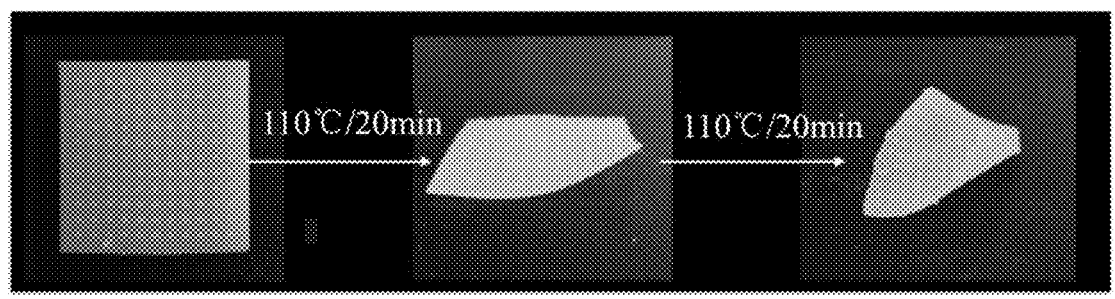
FIG. 4 illustrates the 3D polymer s with surface microstructures prepared by exemplary embodiment 4.

Exemplary embodiments below are detailed descriptions of the present invention. However, the scope of protection is not restricted to exemplary embodiment below.

Exemplary Embodiment 1 (Ester Bond-urethane Bond System)

Raw Materials:
a) Polycaprolactone diol (PCL diol): Mw=10,000, Sigma-Aldrich
b) Poly(hexamethylene diisocyanate): Sigma-Aldrich
c) Dibutyltin dilaurate (DBTDL): TCI
d) 1,5,7-Triazabicyclo[4.4.0]dec-5-ene (TBD):TCI
e) Dimethylformamide (DMF): Aladdin Preparation Method:
0.3 mmol polycaprolactone (PCL) diol and a stoichiometric amount of poly(hexamethylene diisocyanate) were added in 10 ml DMF and melted by heating in an oven at 80° C., wherein mass ratio of polycaprolactone and poly(hexamethylene diisocyanate) is the mole ratio of hydroxyl group and isocyanates group. A predetermined amount of DBTDL (0.5 wt % of total weight) and TBD (2 wt % of total weight) were dissolved into the mixture and stirred for several minutes. The mixture was poured into the mold with specific microstructures and curing was conducted thermally at 90° C. for 12 hours. After curing completely, the sample was demolded. Afterwards, the sample was bended into a 3D surface and thermally annealed under stress (130° C., 10 min), then cooled. Finally, a 3D surface with micro-nanostructures was obtained.

Exemplary Embodiment 2 (Ester Bond-epoxy System)
Raw Materials:
a) Bisphenol A diglycidyl ethers: Mw=340, Aladdin
b) Glutaric anhydride: Mw=114, Aladdin
c) 1,5,7-Triazabicyclo[4.4.0]dec-5-ene (TBD): TCI
d) Dimethylformamide (DMF): Aladdin Preparation Method:
1 mmol bisphenol A diglycidyl ethers and 1 mmol glutaric anhydride were added in 20 ml DMF and melted by heating in an oven at 100° C. A predetermined amount of TBD (2 wt % of total weight) were dissolved into the mixture and stirred for several minutes. The mixture was poured into the mold with specific microstructures and curing was conducted thermally at 110° C. for 12 hours. After curing completely, the sample was demolded. Afterwards, the sample was bended into a 3D surface and thermally annealed under stress (130° C., 10 min), then cooled. Finally, a 3D surface with micro-nanostructures was obtained.

Exemplary Embodiment 3 (Urethane Bond System)
Raw Materials:
a) Poly(tetrahydrofuran) diol: Mw=2,000, Sigma-Aldrich
b) Poly(hexamethylene diisocyanate): Sigma-Aldrich
c) Dibutyltin dilaurate (DBTDL): TCI
d) 1,5,7-Triazabicyclo[4.4.0]dec-5-ene (TBD):TCI
e) Dimethylformamide (DMF): Aladdin Preparation Method:
0.2 mmol poly(tetrahydrofuran) diol, 0.2 mmol poly(hexamethylene diisocyanate) were added in 10 ml DMF and melted by heating in an oven at 80° C., wherein mass ratio of polycaprolactone and poly(hexamethylene diisocyanate) is the mole ratio of hydroxyl group and isocyanates group. A predetermined amount of DBTDL (0.5 wt % of total weight) and TBD (2 wt % of total weight) were dissolved into the mixture and stirred for several minutes. The mixture was poured into the mold with specific microstructures and curing was conducted thermally at 90° C. for 12 hours. After curing completely, the sample was demolded. Afterwards, the sample was bended into a 3D surface and thermally annealed under stress (130° C., 10 min), then cooled. Finally, a 3D surface with micro-nanostructures was obtained.

Exemplary Embodiment 4 (Ester Bond-unsaturated Polyester System)
Raw Materials:
a) Orthophthalic unsaturated polyester oligomer: with 15 wt % maleic anhydride
b) Styrene: Aladdin
c) Cyclohexanone peroxide (UV-184): Aladdin
d) Cobaltous naphthenate: Aladdin
e) 1,5,7-Triazabicyclo[4.4.0]dec-5-ene (TBD): TCI Preparation Method:
6.5 g orthophthalic unsaturated polyester oligomer, 3.5 g styrene, 0.1 g UV-184, 0.05 g cobaltous naphthenate, and 0.2 g TBD were fully mixed at room temperature. The mixture was poured into the mold with specific microstructures and curing was conducted thermally at 60° C. for 4 hours. After curing completely, the sample was demolded. After curing completely, the sample was demolded. Afterwards, the sample was bended into a 3D surface and thermally annealed under stress (130° C., 10 min), then cooled. Then, a 3D surface with microstructures was obtained. The structures were reheated and bended into a 3D surface and thermally annealed under stress (130° C., 10 min), then cooled. Finally, a 3D surface with micro-nanostructures was obtained.

Exemplary Embodiment 5 (Siloxane Bond System)
Raw Materials:
a) Dow Corning Sylgard Elastomer 184 (a "base" and a "curing |agent|[※ 1]")
b) Dibenzylamine: Sigma-Aldrich Preparation Method:
Weight a certain amount of "base" and "curing agent" to the glass bottle (weight ratio: 10:1). A predetermined amount of dibenzylamine (0.5 wt % of total weight) were dissolved into the mixture and stirred for several minutes. The mixture was poured into the mold with specific microstructures and curing was conducted thermally at 100° C. for 1 h. After curing completely, the sample was demolded. Afterwards, the sample was bended into a 3D surface and thermally annealed under stress (110° C., 20 min). Finally, a 3D surface with microstructures was obtained.

Exemplary Embodiment 6 (Multiple Hydrogen Bond System)
Raw Materials:
a) Poly(ethylene glycol) diacrylate (PEGDA): Aladdin
b) Pentaerythritol tetrakis(3-mercaptopropionate) (PTME): Sigma-Aldrich
c) 2-Isocyanatoethyl methacrylate (IEMA): J&K Scientific
d) 2-Amino-4-hydroxy-6-methylpyrimidine (MIS): J&K Scientific
e) Dimethylformamide (DMF): Aladdin
f) Dimethylsulfoxide (DMSO): Sinopharm Chemical Reagent Co., Ltd.
g) Triethylamine: Sinopharm Chemical Reagent Co., Ltd.
Preparation Method:
Preparation of UPyMA: 3 g MIS and 30 ml DMSO were weighted into a flask and melted by heating in an oven at 140° C. After the mixing, 3.72 g IEMA was added to the flask and the reaction proceeded for 10 min. Afterwards, the mixture was rapid cooled to the room temperature and white powders UPyMA precipitated out. After filtering, the powders were washed by alcohol. Finally, the UPyMA was oven dried at 80° C. overnight.

Polymer synthesis: PTME, PEGDA, and UPyMA (mole ratio: 1:2.4:1.6) were added in DMF, followed by the addition of triethylamine (1 wt % of total monomer weight) as the catalyst. The total monomer concentration was maintained at 40 wt % (by monomer weight). The well stirred solution was injected to a mold and the reaction proceeded in an oven at 80° C. for 6 hours. The resulting sample was dried at 80° C. in vacuum. Afterwards, the sample was bended into a 3D surface and thermally annealed under stress (130° C., 10 min). Finally, a 3D surface with micro-nanostructures was obtained.

Exemplary Embodiment 7 (Diels-Alder Reaction System)
Raw Materials:
a) Furfuryl amine (FA): TCI
b) 2,2-Bis(4-glycidyloxyphenyl)propane (BGPP): TCI
c) 1,1'-(Methylenedi-4,1-phenylene)bismaleimide (BM): Sigma-Aldrich
d) Dimethylformamide (DMF): Aladdin
Preparation Method:
1.75 g BGPP and 0.5 g FA were added in 5.5 g DMF and curing was conducted thermally at 120° C. for 10 hours. Afterwards, the mixture was poured into a tetrafluoroethylene mold followed by the addition of 0.39 g BM. The postcuring was conducted thermally at 70° C. for 5 hours and vacuum oven dried for 48 hours. After curing completely, the sample was demolded. Afterwards, the sample was bended into a 3D surface and thermally annealed under stress (130° C., 10 min). Finally, a 3D surface with micro-nanostructures was obtained.

The invention claimed is:

1. A method to prepare a 3D polymer with surface micro-nanostructures, comprising the following steps:
   step (1): synthesizing a 2D thermoset polymer with surface micro-nanostructures, wherein the polymer contains reversible exchangeable bonds;
   step (2): deforming the synthesized polymer to an arbitrary desired shape above the permanent reshaping temperature with an external force applied, wherein the reversible exchangeable bonds undertake reversible exchange;
   the reshaping temperature is above the glass transformation temperature or crystalline melting temperature of the polymer; above the reshaping temperature, the reversible exchangeable bonds are activated;
   step (3): after cooling, a permanent 3D polymer object with surface micro-nanostructure is obtained;
   wherein the polymer contains one or more of ester bond, urethane bond or urea bond while a bond exchange catalyst is added during synthesizing the polymer; and
   wherein steps (2)-(3) can be implemented multiple times to obtain an accumulated complex 3D sheet with surface micro-nanostructure.

2. The method of claim 1, wherein the reversible exchangeable bonds include one or more of ester bond, urethane bond, urea bond, siloxane bond, multiple hydrogen bond, and Diels-Alder reaction bond.

3. The method of claim 1, wherein the thermoset polymer is polyurethane resin, polyurethane-urea resin, acid/anhydride cured epoxy resin, resin with multiple hydrogen bond, or Diels-Alder reaction products.

4. The method of claim 1, wherein the bond exchange catalyst for ester bond, urethane bond, urea bond includes one or more of 1,5,7-triazabicyclo [4.4.0]dec-5-ene, benzyldimethylamide, and salts of tin, zinc, magnesium, cobalt, calcium, and benzyldimethylamine.

5. The method of claim 4, wherein the amount of the bond exchange catalyst ranges from 0.1-5% by weight of the polymer.

6. The method of claim 1, wherein, in step (2), the reshaping temperature is 10° C. above the glass transformation temperature or crystalline melting temperature of the polymer.

7. The method of claim 1, wherein the reshaping temperature falls in the range of 50-130° C. and external stress is held for 5 min-24 hours in step (2).

8. The method of claim 1, wherein the bond exchange catalyst for ester bond, urethane bond, urea bond includes one or more of 1,5,7-triazabicyclo [4.4.0]dec-5-ene, benzyldimethylamide, and salts of magnesium, cobalt, calcium.

* * * * *